United States Patent
Yoon

(10) Patent No.: US 9,995,391 B2
(45) Date of Patent: Jun. 12, 2018

(54) CONTROL METHOD FOR PREVENTING BACKWARD SLIPPING OF VEHICLE

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 369 days.

(21) Appl. No.: 14/993,727

(22) Filed: Jan. 12, 2016

(65) Prior Publication Data

US 2017/0089460 A1  Mar. 30, 2017

(30) Foreign Application Priority Data

Sep. 24, 2015 (KR) .......................... 10-2015-0135301

(51) Int. Cl.
  *F16H 63/36*  (2006.01)
  *B60T 7/12*  (2006.01)
  *B60T 1/06*  (2006.01)

(52) U.S. Cl.
  CPC .............. *F16H 63/36* (2013.01); *B60T 1/062* (2013.01); *B60T 7/122* (2013.01); *B60T 2201/06* (2013.01); *B60T 2210/20* (2013.01); *B60Y 2300/18116* (2013.01); *F16H 2312/04* (2013.01)

(58) Field of Classification Search
  None
  See application file for complete search history.

(56) References Cited

U.S. PATENT DOCUMENTS

| 6,253,144 | B1 | 6/2001 | Yamamura et al. |
| 8,882,635 | B2 | 11/2014 | Nedorezov et al. |
| 2002/0065170 | A1* | 5/2002 | Suzuki ................... F16H 61/20 477/171 |
| 2010/0138129 | A1* | 6/2010 | Mallet ..................... B60T 7/122 701/83 |

(Continued)

FOREIGN PATENT DOCUMENTS

| JP | 2000-006691 A | 1/2000 |
| KR | 10-2007-0107525 A | 11/2007 |

(Continued)

OTHER PUBLICATIONS

Korean Office Action dated Aug. 10, 2016 issued in Korean patent application application No. 10-2015-0135301.

*Primary Examiner* — Jacob S. Scott
(74) *Attorney, Agent, or Firm* — McDermott Will & Emery LLP

(57) ABSTRACT

A control method for preventing backward slipping of a vehicle includes a range detection step in which a controller detects a range position of a shift lever, a gradient comparison step in which the controller compares a gradient of a road with a predetermined reference gradient when it is determined that the position of the shift lever is the D range, a stop state check step where the controller checks a brake and a driving state of the vehicle when it is determined at the gradient comparison step that the gradient of the road is equal to or greater than the reference gradient, and an inter-lock implementation step in which the controller engages multiple gears on an identical shaft when it is determined at the stop state check step that the brake is on and the vehicle has stopped.

4 Claims, 4 Drawing Sheets

(56) References Cited

U.S. PATENT DOCUMENTS

2013/0297161 A1* 11/2013 Gibson ................ B60W 20/00
                                                                               701/54
2017/0248198 A1* 8/2017 Taka ....................... F16H 3/006

FOREIGN PATENT DOCUMENTS

| KR | 10-2011-0132915 A | 12/2011 |
| KR | 10-2013-0046828 A | 5/2013 |
| KR | 10-2014-0012398 A | 2/2014 |
| KR | 10-2014-0049856 A | 4/2014 |

* cited by examiner

FIG. 2

| ENGINE STATE | POSITION OF LEVER | 1ST/6TH GEAR | ODD-NUMBERED GEAR | EVEN-NUMBERED GEAR |
|---|---|---|---|---|
| IG ON | P | N | N | N |
| | R | N | N | N |
| | N | N | N | N |
| | D | N | N | N |
| CRANKING | P | 1 | N | R |
| | R | 1/N | N | R |
| | N | 1 | N | N |
| | D | 1 | 3 | N |

CONTROL METHOD FOR PREVENTING BACKWARD SLIPPING OF VEHICLE

CROSS REFERENCE TO RELATED APPLICATION

The present application claims the benefit of priority to Korean Patent Application No. 10-2015-0135301, filed Sep. 24, 2015 with the Korean Intellectual Property Office, the entire contents of which is incorporated herein for all purposes by this reference.

TECHNICAL FIELD

The present disclosure generally relates to a control method for preventing backward slipping of a vehicle when the vehicle stops on an uphill road.

BACKGROUND

A Dual Clutch Transmission (DCT) is a transmission that uses two clutches and a gear shifting mechanism of an existing manual transmission. In the case of a DCT, actual gear shifting is performed by converting the engagement state of two clutches under the condition that a target gear has been engaged.

Particularly, a vehicle having a nine-speed DCT arranges one of the two clutches for odd-numbered gears (1, 3, 5, 7, and 9) and one of the two clutches for even-numbered gears (2, 4, 6, 8, and R). However, as the number of gears on the same shaft is an odd number, it is necessary to use an actuator that controls both the odd-numbered gear and the even-numbered gear or an actuator that controls only one gear.

According to the configuration of such an actuator, if two gears on the same shaft are selected at the same time, they inter-lock so that driving is impossible. When inter-lock occurs, the transmission may lock up, and may cause an adverse event. Therefore, it is necessary to prevent inter-lock.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure uses the above problem on the positive side, and an object of the present disclosure is to provide a control method for preventing backward slipping of a vehicle, which implements a backward slipping prevention system without Hill-start assist control (HAC) by using inter-lock of the vehicle to prevent the backward slipping of the vehicle during an uphill drive.

In order to achieve the above object, a control method for preventing backward slipping of a vehicle according to the present disclosure may include a range detection step for detecting a range position of a shift lever; a gradient comparison step for comparing a gradient of a road with a predetermined reference gradient when it is determined at the range detection step that the position of the shift lever is in the D range; a stop state check step for checking a brake and a driving state of the vehicle when it is determined at the gradient comparison step that the gradient of the road is equal to or greater than the reference gradient; and an inter-lock implementation step for engaging multiple gears on an identical shaft when it is determined at the stop state check step that the brake is ON and the vehicle has stopped.

In the inter-lock implementation step, a first actuator engages a first gear on the identical shaft, and a second actuator engages one of odd-numbered gears excluding the first gear.

After the inter-lock implementation step, the control method for preventing backward slipping of the vehicle may further include an opening amount comparison step for comparing an opening amount of an accelerator pedal with a predetermined reference value, a torque comparison step for comparing wheel drive torque with road load torque when it is determined at the opening amount comparison step that the opening amount of the accelerator pedal is equal to or greater than the reference value, and an inter-lock release step for engaging only the first gear on the identical shaft and releasing engagement of the other gear when it is determined at the torque comparison step that the wheel drive torque is greater than the road load torque.

The wheel drive torque may be calculated by multiplying clutch torque by gear ratio, and the road load torque may be calculated by adding rolling resistance and gradient resistance.

According to the control method for preventing backward slipping of a vehicle, configured as the above description, because backward slipping of a vehicle is prevented using inter-lock of a vehicle transmission, there is no need to add an HAC, thus reducing the package volume and production cost of the vehicle.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2 is a table illustrating gear engagement depending on the position of a shift lever according to an embodiment of the present disclosure;

DETAILED DESCRIPTION OF THE DISCLOSURE

Hereinafter, a control method for preventing backward slipping of a vehicle according to a preferred embedment of the present disclosure will be described with reference to the accompanying drawings.

Figure 4:
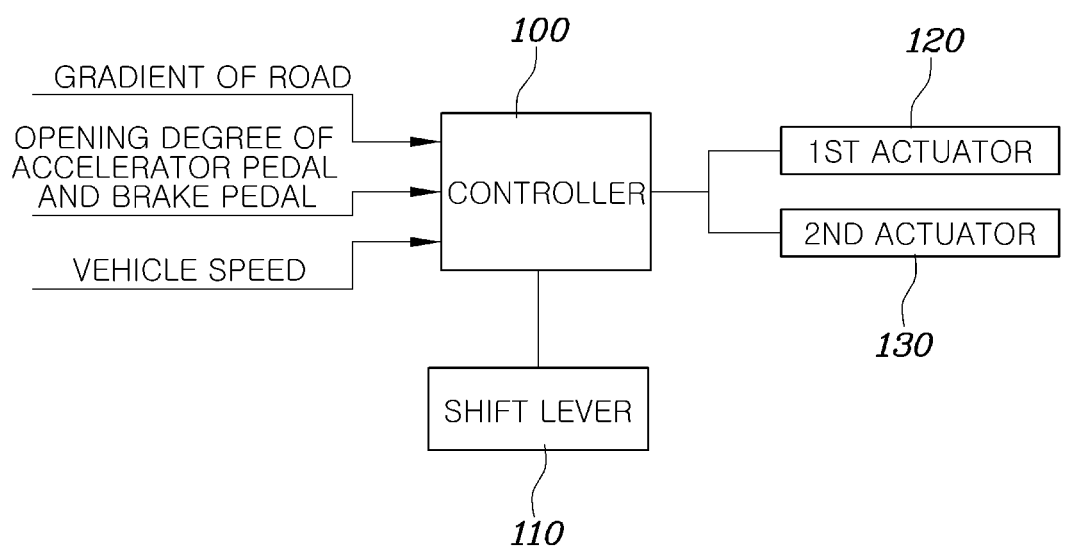
FIG. 4 is a block diagram illustrating a control device for preventing backward slipping of a vehicle according to an embodiment of the present disclosure.

FIG. 4 is a block diagram illustrating a control device for preventing backward slipping of a vehicle according to an embodiment of the present disclosure. Referring to FIG. 4, a controller 100 may detect the range position of a shift lever 110, and control engagement of a transmission gear using a first actuator 120 and a second actuator 130. Also, the controller 100 may receive data pertaining to the gradient of a road, the opening amount of an accelerator pedal and/or brake pedal, and vehicle speed through additional sensors. The specific control and sensors of the controller 100 will be described later.

Figure 1:
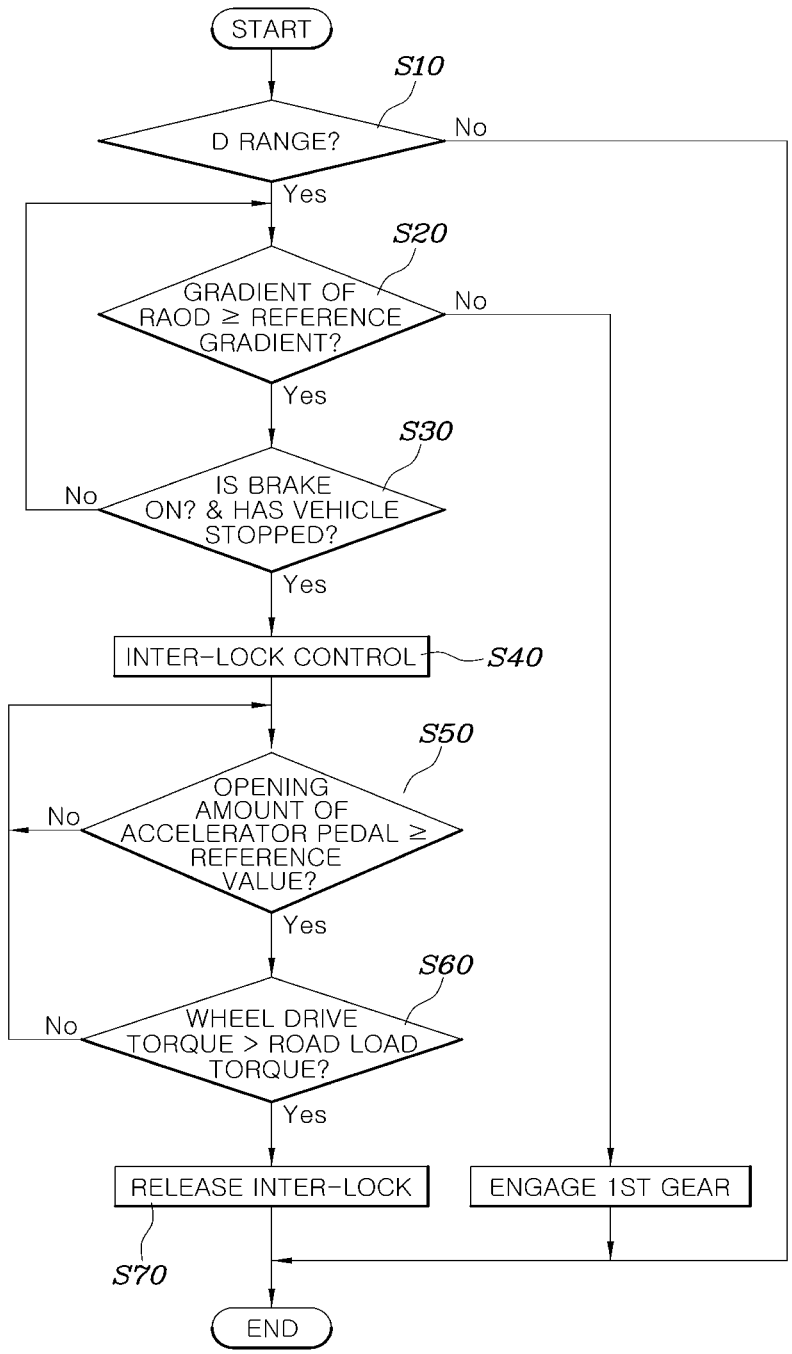
FIG. 1 is a flowchart illustrating a control method for preventing backward slipping of a vehicle according to an embodiment of the present disclosure.

FIG. 1 is a flowchart illustrating a control method for preventing backward slipping of a vehicle according to an embodiment of the present disclosure. Referring to FIG. 1, the control method for preventing backward slipping of a vehicle may include a range detection step (S10) in which the controller detects the range position of a shift lever, a gradient comparison step (S20) in which the controller compares the gradient of a road with a predetermined gradient when it is determined at the range detection step (S10) that the position of the shift lever is in the D range, a stop state check step (S30) in which the controller checks a brake and the driving state of the vehicle when it is determined at the gradient comparison step (S20) that the gradient of the road is equal to or greater than the reference gradient, and an inter-lock implementation step (S40) in which the controller engages multiple gears on the same shaft when it is determined at the stop state check step (S30) that the brake is ON and the vehicle has stopped.

In other words, the controller sequentially performs the range detection step (S10), the gradient comparison step (S20), and the stop state check step (S30) in order to determine whether the vehicle is in a situation in which the vehicle may slip backward.

Specifically, when the position of the shift lever is in the D range, when the gradient of the road is equal to or greater than the predetermined gradient, and when the brake is ON and the vehicle has stopped, the controller may determine that the vehicle has stopped forward driving on the uphill road and prevention of backward slipping of the vehicle is necessary.

Here, the controller may detect the position of the shift lever, the gradient of the road, the state of the brake, and the driving state respectively using an inhibitor switch in the shift lever, a gradient sensor, a brake pedal sensor, and a vehicle speed sensor. However, this may be different according to sensors arranged in a vehicle, without limiting the disclosure to the above example.

If the controller determines through the stop state check step (S30) that the vehicle has stopped on an uphill road, backward slipping of the vehicle may be prevented by engaging multiple gears on the same shaft (S40). In other words, engagement of multiple gears on the same input shaft or output shaft of a transmission may cause inter-lock, and as a result, the vehicle maintains a stationary state. Therefore, by using inter-lock, backward slipping of the vehicle may be prevented.

Meanwhile, the controller may terminate this logic when it is determined at the range detection step (S10) that the position of the shift lever is not in the D range, and may engage the first gear using the first actuator when it is determined at the gradient comparison step (S20) that the gradient of the road is less than the reference gradient. Also, as the result of the stop state check step (S30), when the brake is OFF or when the vehicle is being driven, the gradient comparison step (S20) may be performed again to accurately determine whether the vehicle has stopped forward driving on the uphill road.

Specifically, when the interlock implementation step (S40) is performed, the controller makes the first actuator engage the first gear on the same shaft and makes the second actuator engage any one of odd-numbered gears excluding the first gear on the same shaft.

The first actuator may be arranged to engage the first gear, or to engage one of the first gear and even-numbered gears. Also, the second actuator may be arranged to engage odd-numbered gears excluding the first gear.

In other words, when it is determined at the stop state check step (S30) that the brake is ON and the vehicle has stopped, as the vehicle must move forward, the controller may engage the first gear using the first actuator. At the same time, the controller may engage one of the odd-numbered gears, which are engaged on the same shaft with the first gear, using the second actuator, whereby the vehicle enters the inter-lock state. Therefore, when the vehicle stops on the uphill road, the vehicle is prevented from backward slipping.

For example, FIG. 2 is a table illustrating a gear engagement depending on the position of the shift lever according to an embodiment of the present disclosure. Referring to FIG. 2, when the first actuator is arranged to engage the first gear or sixth gear and the second actuator is arranged to engage odd-numbered gears, if the position of the shift lever is in the D range and the vehicle stops on the uphill road, the first gear and one of odd-numbered gears may be engaged to implement inter-lock of the vehicle. In FIG. 2, among the odd-numbered gears, the third gear is engaged, but this is just one embodiment and may be different according to various vehicles or designers. In FIG. 2, "IG" may refer to "ignition".

Meanwhile, after the interlock implementation step (S40), an opening amount comparison step (S50) in which the controller compares the opening amount of an accelerator pedal with a predetermined reference value, a torque comparison step (S60) for comparing wheel drive torque with road load torque when it is determined at the opening amount comparison step (S50) that the opening amount of the accelerator pedal is equal to or greater than the reference value, and an inter-lock release step (S70) for engaging only the first gear and releasing the other gears on the same shaft when it is determined at the torque comparison step (S60) that the wheel drive torque is greater than the road load torque may be further included.

In other words, when the vehicle is controlled to be in an inter-lock state, the controller may determine whether the driver intends to accelerate the vehicle by comparing the opening amount of the accelerator pedal with the reference value (S50). If the opening amount of the accelerator pedal is equal to or greater than the reference value, it is determined that the driver intends to drive the vehicle forward, and the torque comparison step (S60) may be performed. The controller may detect the opening amount of the accelerator pedal using an Acceleration Pedal Sensor (APS).

Here, the wheel drive torque is calculated by multiplying a clutch torque by a gear ratio, and the road load torque is calculated by adding a rolling resistance to a gradient resistance.

Here, the wheel drive torque is torque applied to the wheel of a vehicle, and torque, delivered to the driving wheel, varies depending on the gear ratio and whether the clutch is engaged. Therefore, the wheel drive torque may be calculated by multiplying the clutch torque by the gear ratio. Also, the road load torque may be calculated as the addition of the rolling resistance, which is the force resisting the motion when a wheel rolls on a surface, and the gradient resistance according to the gradient of the road. Therefore, as the frictional force of the wheel and the gradient of the road increase, the road load torque increases.

In other words, because the wheel drive torque is torque for forward driving of the vehicle and the road load torque is torque resisting forward driving, the vehicle starts to move forward only when the wheel drive torque is greater than the road load torque.

Therefore, even if a driver intends to drive by stepping on an accelerator pedal, the vehicle slips backward when interlock is released under the condition that the wheel drive torque is less than the road load torque. Therefore, only when the wheel drive torque is greater than the road load torque inter-lock may be released (S70). Accordingly, when the vehicle starts to move after stopping on an uphill road, backward slipping may be prevented.

Figure 3:
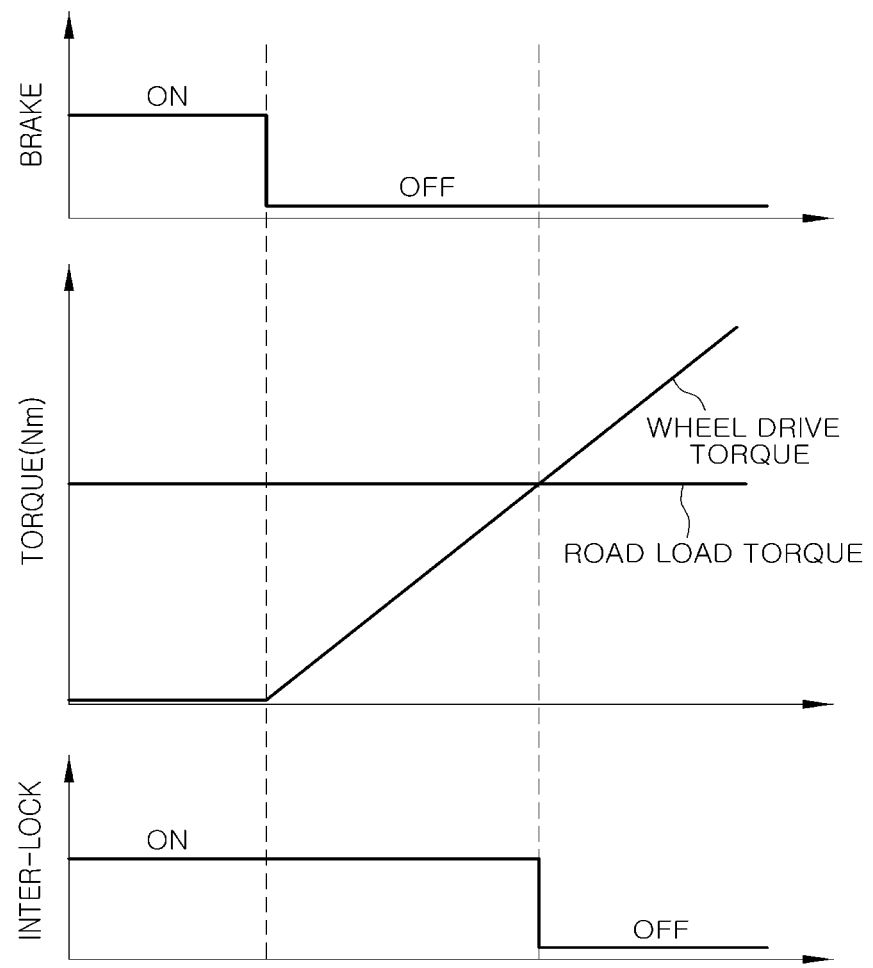
FIG. 3 is a graph illustrating the time at which inter-lock is released depending on wheel drive torque and road load torque.

FIG. 3 is a graph illustrating the time at which interlock is released according to the wheel drive torque and road load torque. Referring to FIG. 3, when a driver lifts his or her foot off the brake and presses the accelerator pedal in order to drive a vehicle, wheel drive torque increases. In this case, if the wheel drive torque is less than the road load torque, inter-lock is maintained. If the wheel drive torque is greater than the road load torque, inter-lock is released. Therefore backward slipping of the vehicle may be prevented.

Here, as there are various conventional techniques concerning methods for calculating clutch torque, rolling resistance, and gradient resistance, a detailed description is omitted. For reference, the controller may be a Transmission Control Unit (TCU) for controlling a vehicle transmission.

According to the control method for preventing backward slipping of a vehicle, configured as the above description, as backward slipping of a vehicle is prevented using inter-lock of a vehicle transmission, there is no need to add an HAC, thus reducing the production cost of the vehicle and package volume.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A control method for preventing backward slipping of a vehicle, comprising:
   a range detection step in which a controller detects a range position of a shift lever;
   a gradient comparison step in which the controller compares a gradient of a road with a predetermined reference gradient when it is determined at the range detection step that the position of the shift lever is the D range;
   a stop state check step in which the controller checks a brake and a driving state of the vehicle when it is determined at the gradient comparison step that the gradient of the road is equal to or greater than the reference gradient; and
   an inter-lock implementation step in which the controller engages multiple gears on an identical shaft when it is determined at the stop state check step that the brake is on and the vehicle has stopped.

2. The control method of claim 1, wherein in the inter-lock implementation step, the controller makes a first actuator engage a first gear on the identical shaft, and makes a second actuator engage one of odd-numbered gears excluding the first gear.

3. The control method of claim 1, further comprising:
   after the inter-lock implementation step, an opening amount comparison step in which the controller compares an opening amount of an accelerator pedal with a predetermined reference value;
   a torque comparison step in which the controller compares wheel drive torque with road load torque when it is determined at the opening amount comparison step that the opening amount of the accelerator pedal is equal to or greater than the reference value; and
   an inter-lock release step in which the controller engages only the first gear on the identical shaft and releases engagement of the other previously-engaged odd-numbered gear when it is determined at the torque comparison step that the wheel drive torque is greater than the road load torque.

4. The control method of claim 3, wherein the wheel drive torque is calculated by multiplying a clutch torque by a gear ratio, and the road load torque is calculated by adding a rolling resistance and a gradient resistance.

\* \* \* \* \*